United States Patent
Tanner et al.

(10) Patent No.: US 11,315,352 B2
(45) Date of Patent: Apr. 26, 2022

(54) CALCULATING THE PRECISION OF IMAGE ANNOTATIONS

(71) Applicant: Raytheon Company, Waltham, MA (US)

(72) Inventors: Franklin Tanner, Ashburn, VA (US); Grayson D. Gunderson, Blacksburg, VA (US); Jeffrey S. Klein, Fairfax, VA (US)

(73) Assignee: Raytheon Company, Waltham, MA (US)

( * ) Notice: Subject to any disclaimer, the term of this patent is extended or adjusted under 35 U.S.C. 154(b) by 177 days.

(21) Appl. No.: 16/866,707

(22) Filed: May 5, 2020

(65) Prior Publication Data

US 2020/0356770 A1 Nov. 12, 2020

Related U.S. Application Data

(60) Provisional application No. 62/844,996, filed on May 8, 2019.

(51) Int. Cl.
*G06K 9/34* (2006.01)
*G06V 30/413* (2022.01)
(Continued)

(52) U.S. Cl.
CPC ............ *G06V 30/413* (2022.01); *G06N 3/08* (2013.01); *G06V 10/751* (2022.01)

(58) Field of Classification Search
CPC ............ G06K 9/00456; G06K 9/6202; G06K 9/00288; G06K 9/00664; G06K 9/4628;
(Continued)

(56) References Cited

U.S. PATENT DOCUMENTS 6,671,391 B1  12/2003  Zhang et al.
7,020,337 B2  3/2006  Viola et al.
(Continued)

FOREIGN PATENT DOCUMENTS

CN   108427951 A   8/2018
CN   109190626 A   1/2019
CN   109255322 A   1/2019

OTHER PUBLICATIONS

"Australian Application Serial No. 2020203026, First Examination Report dated Nov. 6, 2020", 5 pgs.
(Continued)

*Primary Examiner* — Solomon G Bezuayehu
(74) *Attorney, Agent, or Firm* — Schwegman Lundberg & Woessner, P.A.

(57) ABSTRACT

A machine receives, for a given target in a given image, a plurality of annotations, each annotation indicating a range of pixels corresponding to the given target. The machine computes a number of pixels in an intersection of the plurality of annotations. The machine computes an average pixels on target (APOT) for the given target by computing, for each annotation, a number of pixels that corresponds to the given target and taking a mean of those numbers. The machine computes a precision value of the plurality of annotations as the number of pixels in the intersection divided by the APOT. The machine provides an output representing the precision value.

15 Claims, 9 Drawing Sheets

(51) Int. Cl.
*G06N 3/08* (2006.01)
*G06V 10/75* (2022.01)

(58) Field of Classification Search
CPC ...... G06K 9/6256; G06K 9/6271; G06N 3/08; G06N 3/0445; G06N 5/003; G06N 20/10; G06N 20/20; G06N 3/0454; G06N 3/084
See application file for complete search history.

(56) References Cited

U.S. PATENT DOCUMENTS

| | | | |
|---|---|---|---|
| 8,463,006 | B2 | 6/2013 | Prokoski |
| 9,697,416 | B2 | 7/2017 | Shen et al. |
| 10,157,331 | B1 | 12/2018 | Tang et al. |
| 10,255,522 | B2 | 4/2019 | Pinheiro et al. |
| 10,438,059 | B2 | 10/2019 | Saruta et al. |
| 10,521,705 | B2 | 12/2019 | Lu et al. |
| 10,558,849 | B2 | 2/2020 | Gupta et al. |
| 2009/0268103 | A1* | 10/2009 | Fujimori .............. H04N 9/3188 348/745 |
| 2010/0177331 | A1* | 7/2010 | Suzuki .................... H04N 1/58 358/1.9 |
| 2012/0093420 | A1* | 4/2012 | Zhang .................. G06K 9/4614 382/197 |
| 2013/0182002 | A1* | 7/2013 | Macciola ................ G06F 17/40 345/589 |
| 2017/0103532 | A1 | 4/2017 | Ghesu et al. |
| 2017/0310851 | A1* | 10/2017 | Dobashi ............... H04N 1/6008 |
| 2018/0268528 | A1* | 9/2018 | Matsushita ............... G06T 5/50 |

OTHER PUBLICATIONS

Jordan, Jeremy, "Evaluating image segmentation models", Data Science, [Online], Retrieved from the Internet: <https://www.jeremyjordan.me/evaluating-image-segmentation-models>, (May 30, 2018), 7 pgs.

Rezatofighi, Hamid, et al., "Generalized Intersection over Union: A Metric and A Loss for Bounding Box Regression", arXiv:1902.09630v1, (2019), 9 pgs.

Tanner, Franklin, et al., "Overhead Imagery Research Data Set—An annotated data library and tools to aid in the development of computer vision algorithms", IEEE Applied Imagery Pattern Recognition Workshop, (2009), 1-8.

Timofeeva, Anastasia, et al., "Automatic Image Annotation with Ensemble of Convolutional Neural Networks", CEUR-WS, vol. 2403, (2019), 5 pgs.

"Australian Application Serial No. 2020203026, Response filed May 17, 2021 to First Examination Report dated Nov. 6, 2020", 63 pgs.

* cited by examiner

//CALCULATING THE PRECISION OF IMAGE ANNOTATIONS

PRIORITY CLAIM

This application claims priority to U.S. Provisional Patent Application No. 62/844,996, filed on May 8, 2019, entitled "CALCULATING THE PRECISION OF IMAGE ANNOTATIONS," the entire content of which is incorporated herein by reference.

TECHNICAL FIELD

Embodiments pertain to computer architecture. Some embodiments relate to neural networks. Some embodiments relate to a metric for calculating the precision of multiple independent image annotations.

BACKGROUND

To train a neural network to recognize image(s) of object(s) (e.g., cars, airplanes, dogs, cats, etc.) a training set with annotated images is provided. The images may be annotated by an agent, such as a human or a machine. However, different agents may annotate different pixel(s) as being associated with the image. Some annotations may be more or less accurate than others, and the accuracy of a given annotation may be useful to a neural network during the training phase. As the foregoing illustrates, a metric for calculating the precision of multiple independent image annotations.

SUMMARY

Figure 1:
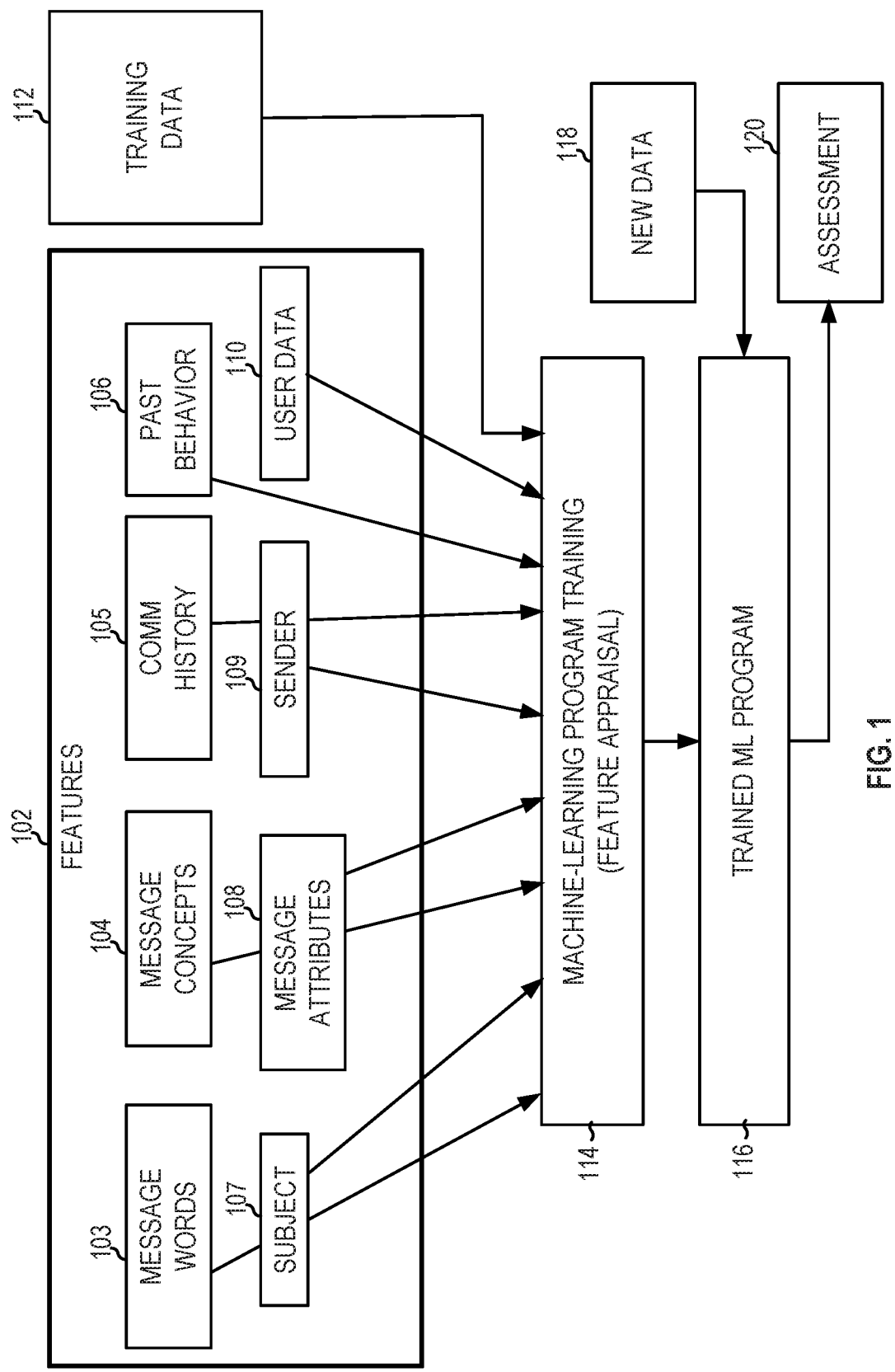
FIG. 1 illustrates the training and use of a machine-learning program, in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

According to some embodiments, a method includes receiving, for a given target in a given image, a plurality of annotations, each annotation indicating a range of pixels corresponding to the given target. The method includes computing a number of pixels in an intersection of the plurality of annotations. The method includes computing an average pixels on target (APOT) for the given target by computing, for each annotation, a number of pixels that corresponds to the given target and taking a mean of those numbers. The method includes computing a precision value of the plurality of annotations as the number of pixels in the intersection divided by the APOT. The method includes providing an output representing the precision value.

Some aspects include a machine-readable medium storing instructions to perform the method above. Some aspects include an apparatus comprising processing circuitry and memory, the memory storing instructions to perform the method above. Some aspects include a system including means for performing the method above.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments relate to calculating the precision of image annotations which may be, for example, generated by one or more neural engines or used for training one or more neural engines. In some embodiments, one or more computing machines receive, for a given target in a given image, a plurality of annotations (e.g., bounding boxes or other polygons), each annotation indicating a range of pixels corresponding to the given target. The computing machine(s) compute a number of pixels in an intersection of the plurality of annotations. The computing machine(s) compute an average pixels on target (APOT) for the given target by computing, for each annotation, a number of pixels that corresponds to the given target and taking a mean of those numbers. The computing machine(s) compute a precision value of the plurality of annotations as the number of pixels in the intersection divided by the APOT. The computing machine(s) provide an output representing the precision value.

In some cases, the plurality of annotations are generated by an ensemble of neural engines. If the precision value exceeds a predefined threshold (e.g., 0.75, 0.9 or 0.95), the computing machine(s) determine that the ensemble of neural engines has been adequately trained to identify the target, and provides one or more neural engines in the ensemble for deployment. If the precision value does not exceed the predefined threshold, the computing machine(s) determine that the ensemble of neural engines has not been adequately trained to identify the target, and further trains at least one neural engine in the ensemble before deployment.

Aspects of the present invention may be implemented as part of a computer system. The computer system may be one physical machine, or may be distributed among multiple physical machines, such as by role or function, or by process thread in the case of a cloud computing distributed model. In various embodiments, aspects of the invention may be configured to run in virtual machines that in turn are executed on one or more physical machines. It will be understood by persons of skill in the art that features of the invention may be realized by a variety of different suitable machine implementations.

The system includes various engines, each of which is constructed, programmed, configured, or otherwise adapted, to carry out a function or set of functions. The term engine as used herein means a tangible device, component, or arrangement of components implemented using hardware, such as by an application specific integrated circuit (ASIC) or field-programmable gate array (FPGA), for example, or as a combination of hardware and software, such as by a processor-based computing platform and a set of program instructions that transform the computing platform into a special-purpose device to implement the particular functionality. An engine may also be implemented as a combination of the two, with certain functions facilitated by hardware alone, and other functions facilitated by a combination of hardware and software.

In an example, the software may reside in executable or non-executable form on a tangible machine-readable storage medium. Software residing in non-executable form may be compiled, translated, or otherwise converted to an executable form prior to, or during, runtime. In an example, the software, when executed by the underlying hardware of the engine, causes the hardware to perform the specified operations. Accordingly, an engine is physically constructed, or specifically configured (e.g., hardwired), or temporarily configured (e.g., programmed) to operate in a specified manner or to perform part or all of any operations described herein in connection with that engine.

Considering examples in which engines are temporarily configured, each of the engines may be instantiated at different moments in time. For example, where the engines comprise a general-purpose hardware processor core configured using software; the general-purpose hardware processor core may be configured as respective different engines at different times. Software may accordingly configure a hardware processor core, for example, to constitute a particular engine at one instance of time and to constitute a different engine at a different instance of time.

In certain implementations, at least a portion, and in some cases, all, of an engine may be executed on the processor(s) of one or more computers that execute an operating system, system programs, and application programs, while also implementing the engine using multitasking, multithreading, distributed (e.g., cluster, peer-peer, cloud, etc.) processing where appropriate, or other such techniques. Accordingly, each engine may be realized in a variety of suitable configurations, and should generally not be limited to any particular implementation exemplified herein, unless such limitations are expressly called out.

In addition, an engine may itself be composed of more than one sub-engines, each of which may be regarded as an engine in its own right. Moreover, in the embodiments described herein, each of the various engines corresponds to a defined functionality; however, it should be understood that in other contemplated embodiments, each functionality may be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

FIG. 1 illustrates the training and use of a machine-learning program, according to some example embodiments. In some example embodiments, machine-learning programs (MLPs), also referred to as machine-learning algorithms or tools, are utilized to perform operations associated with machine learning tasks, such as image recognition or machine translation.

Machine learning is a field of study that gives computers the ability to learn without being explicitly programmed. Machine learning explores the study and construction of algorithms, also referred to herein as tools, which may learn from existing data and make predictions about new data. Such machine-learning tools operate by building a model from example training data 112 in order to make data-driven predictions or decisions expressed as outputs or assessments 120. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, is this object an apple or an orange). Regression algorithms aim at quantifying some items (for example, by providing a value that is a real number). The machine-learning algorithms utilize the training data 112 to find correlations among identified features 102 that affect the outcome.

The machine-learning algorithms utilize features 102 for analyzing the data to generate assessments 120. A feature 102 is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs.

In one example embodiment, the features 102 may be of different types and may include one or more of words of the message 103, message concepts 104, communication history 105, past user behavior 106, subject of the message 107, other message attributes 108, sender 109, and user data 110.

The machine-learning algorithms utilize the training data 112 to find correlations among the identified features 102 that affect the outcome or assessment 120. In some example embodiments, the training data 112 includes labeled data, which is known data for one or more identified features 102 and one or more outcomes, such as detecting communication patterns, detecting the meaning of the message, generating a summary of the message, detecting action items in the message, detecting urgency in the message, detecting a relationship of the user to the sender, calculating score attributes, calculating message scores, etc.

With the training data 112 and the identified features 102, the machine-learning tool is trained at operation 114. The machine-learning tool appraises the value of the features 102 as they correlate to the training data 112. The result of the training is the trained machine-learning program 116.

When the machine-learning program 116 is used to perform an assessment, new data 118 is provided as an input to the trained machine-learning program 116, and the machine-learning program 116 generates the assessment 120 as output. For example, when a message is checked for an action item, the machine-learning program utilizes the message content and message metadata to determine if there is a request for an action in the message.

Machine learning techniques train models to accurately make predictions on data fed into the models (e.g., what was said by a user in a given utterance; whether a noun is a person, place, or thing; what the weather will be like tomorrow). During a learning phase, the models are developed against a training dataset of inputs to optimize the models to correctly predict the output for a given input. Generally, the learning phase may be supervised, semi-supervised, or unsupervised; indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

Models may be run against a training dataset for several epochs (e.g., iterations), in which the training dataset is repeatedly fed into the model to refine its results. For example, in a supervised learning phase, a model is developed to predict the output for a given set of inputs, and is evaluated over several epochs to more reliably provide the output that is specified as corresponding to the given input for the greatest number of inputs for the training dataset. In another example, for an unsupervised learning phase, a model is developed to cluster the dataset into n groups, and is evaluated over several epochs as to how consistently it places a given input into a given group and how reliably it produces the n desired clusters across each epoch.

Once an epoch is run, the models are evaluated and the values of their variables are adjusted to attempt to better refine the model in an iterative fashion. In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, deep neural networks, etc.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the $n^{th}$ epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data that is has not been trained on. In a second example, a false positive rate or false negative rate may be used to evaluate the models after finalization. In a third example, a delineation between data clusterings is used to select a model that produces the clearest bounds for its clusters of data.

Figure 2:
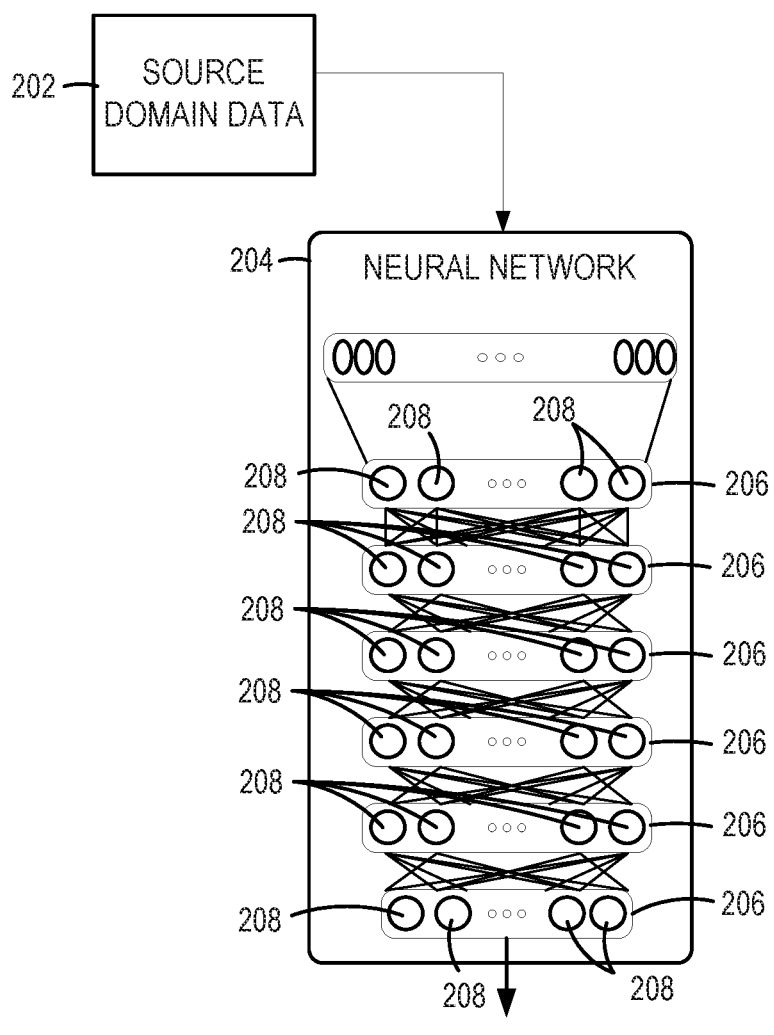
FIG. 2 illustrates an example neural network, in accordance with some embodiments.
Figure 2:
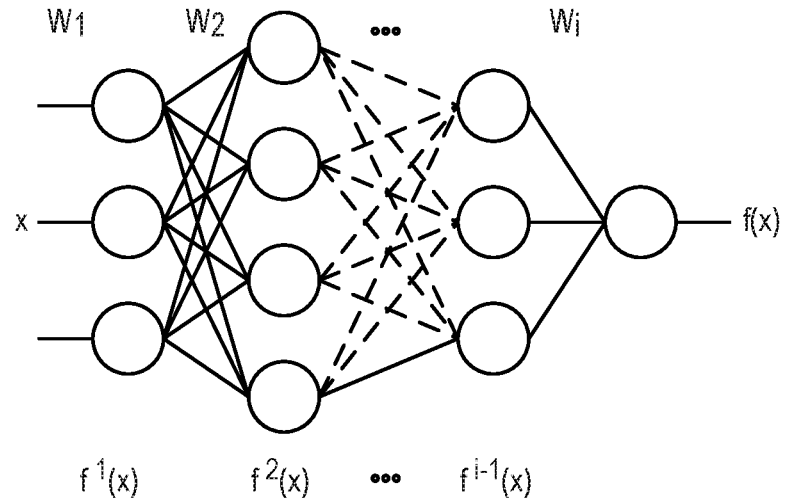

FIG. 2 illustrates an example neural network 204, in accordance with some embodiments. As shown, the neural network 204 receives, as input, source domain data 202. The input is passed through a plurality of layers 206 to arrive at an output. Each layer 206 includes multiple neurons 208. The neurons 208 receive input from neurons of a previous layer and apply weights to the values received from those neurons in order to generate a neuron output. The neuron outputs from the final layer 206 are combined to generate the output of the neural network 204.

As illustrated at the bottom of FIG. 2, the input is a vector x. The input is passed through multiple layers 206, where weights $W_1$, $W_2$, . . . , $W_i$ are applied to the input to each layer to arrive at $f^1(x)$, $f^2(x)$, . . . , $f^{i-1}(x)$, until finally the output f(x) is computed.

In some example embodiments, the neural network 204 (e.g., deep learning, deep convolutional, or recurrent neural network) comprises a series of neurons 208, such as Long Short Term Memory (LSTM) nodes, arranged into a network. A neuron 208 is an architectural element used in data processing and artificial intelligence, particularly machine learning, which includes memory that may determine when to "remember" and when to "forget" values held in that memory based on the weights of inputs provided to the given neuron 208. Each of the neurons 208 used herein are configured to accept a predefined number of inputs from other neurons 208 in the neural network 204 to provide relational and sub-relational outputs for the content of the frames being analyzed. Individual neurons 208 may be chained together and/or organized into tree structures in various configurations of neural networks to provide interactions and relationship learning modeling for how each of the frames in an utterance are related to one another.

For example, an LSTM node serving as a neuron includes several gates to handle input vectors (e.g., phonemes from an utterance), a memory cell, and an output vector (e.g., contextual representation). The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation. One of skill in the art will appreciate that neurons and neural networks may be constructed programmatically (e.g., via software instructions) or via specialized hardware linking each neuron to form the neural network.

Neural networks utilize features for analyzing the data to generate assessments (e.g., recognize units of speech). A feature is an individual measurable property of a phenomenon being observed. The concept of feature is related to that of an explanatory variable used in statistical techniques such as linear regression. Further, deep features represent the output of nodes in hidden layers of the deep neural network.

A neural network, sometimes referred to as an artificial neural network, is a computing system/apparatus based on consideration of biological neural networks of animal brains. Such systems/apparatus progressively improve performance, which is referred to as learning, to perform tasks, typically without task-specific programming. For example, in image recognition, a neural network may be taught to identify images that contain an object by analyzing example images that have been tagged with a name for the object and, having learnt the object and name, may use the analytic results to identify the object in untagged images. A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input, which assigns significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that are used with an optimization method such as a stochastic gradient descent (SGD) method.

Use of backpropagation can include propagation and weight update. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

Figure 3:
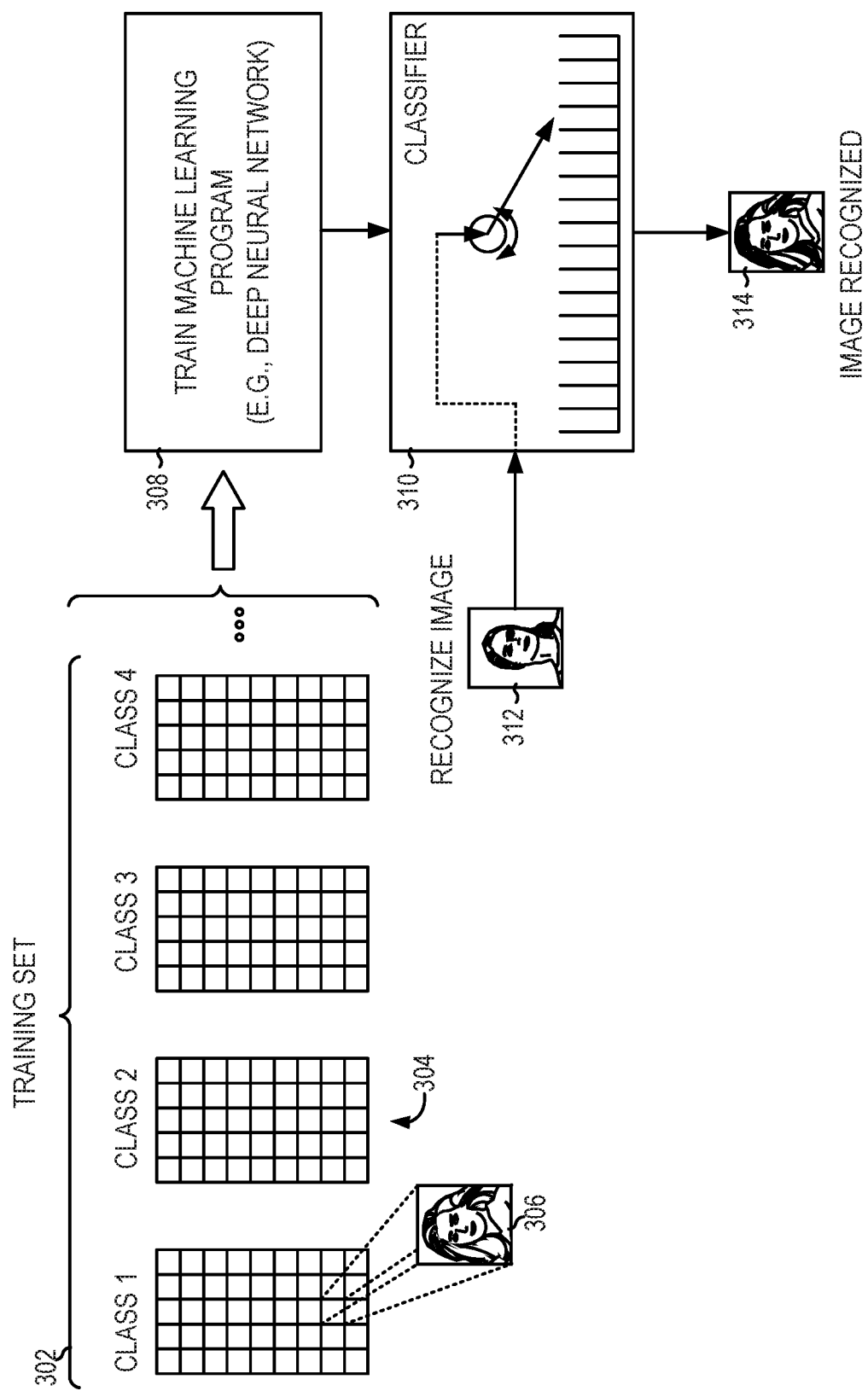
FIG. 3 illustrates the training of an image recognition machine learning program, in accordance with some embodiments.

FIG. 3 illustrates the training of an image recognition machine learning program, in accordance with some embodiments. The machine learning program may be implemented at one or more computing machines. Block 302 illustrates a training set, which includes multiple classes 304. Each class 304 includes multiple images 306 associated with the class. Each class 304 may correspond to a type of object in the image 306 (e.g., a digit 0-9, a man or a woman, a cat or a dog, etc.). In one example, the machine learning program is trained to recognize images of the presidents of the United States, and each class corresponds to each president (e.g., one class corresponds to Barack Obama, one class corresponds to George W. Bush, etc.). At block 308 the machine learning program is trained, for example, using a deep neural network. At block 310, the trained classifier, generated by the training of block 308, recognizes an image 312, and at block 314 the image is recognized. For example, if the image 312 is a photograph of Bill Clinton, the classifier recognizes the image as corresponding to Bill Clinton at block 314.

FIG. 3 illustrates the training of a classifier, according to some example embodiments. A machine learning algorithm is designed for recognizing faces, and a training set 302 includes data that maps a sample to a class 304 (e.g., a class includes all the images of purses). The classes may also be referred to as labels. Although embodiments presented herein are presented with reference to object recognition, the same principles may be applied to train machine-learning programs used for recognizing any type of items.

The training set 302 includes a plurality of images 306 for each class 304 (e.g., image 306), and each image is associated with one of the categories to be recognized (e.g., a class). The machine learning program is trained 308 with the training data to generate a classifier 310 operable to recognize images. In some example embodiments, the machine learning program is a DNN.

When an input image 312 is to be recognized, the classifier 310 analyzes the input image 312 to identify the class (e.g., class 314) corresponding to the input image 312.

Figure 4:
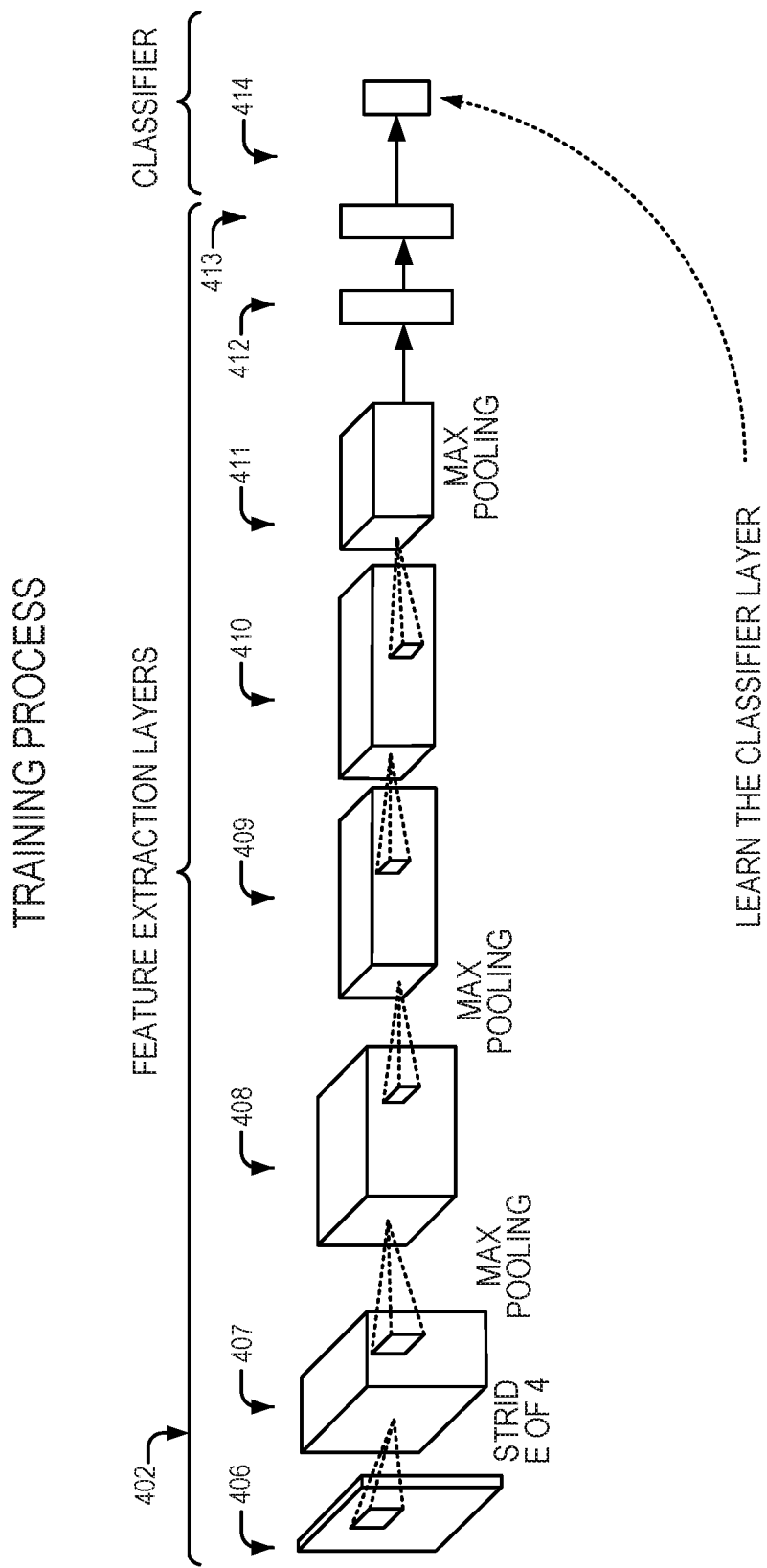
FIG. 4 illustrates the feature-extraction process and classifier training, in accordance with some embodiments.

FIG. 4 illustrates the feature-extraction process and classifier training, according to some example embodiments. Training the classifier may be divided into feature extraction layers 402 and classifier layer 414. Each image is analyzed in sequence by a plurality of layers 406-413 in the feature-extraction layers 402.

With the development of deep convolutional neural networks, the focus in face recognition has been to learn a good face feature space, in which faces of the same person are close to each other, and faces of different persons are far away from each other. For example, the verification task with the LFW (Labeled Faces in the Wild) dataset has been often used for face verification.

Many face identification tasks (e.g., MegaFace and LFW) are based on a similarity comparison between the images in the gallery set and the query set, which is essentially a K-nearest-neighborhood (KNN) method to estimate the person's identity. In the ideal case, there is a good face feature extractor (inter-class distance is always larger than the intra-class distance), and the KNN method is adequate to estimate the person's identity.

Feature extraction is a process to reduce the amount of resources required to describe a large set of data. When performing analysis of complex data, one of the major problems stems from the number of variables involved. Analysis with a large number of variables generally requires a large amount of memory and computational power, and it may cause a classification algorithm to overfit to training samples and generalize poorly to new samples. Feature extraction is a general term describing methods of constructing combinations of variables to get around these large data-set problems while still describing the data with sufficient accuracy for the desired purpose.

In some example embodiments, feature extraction starts from an initial set of measured data and builds derived values (features) intended to be informative and non-redundant, facilitating the subsequent learning and generalization steps. Further, feature extraction is related to dimensionality reduction, such as be reducing large vectors (sometimes with very sparse data) to smaller vectors capturing the same, or similar, amount of information.

Determining a subset of the initial features is called feature selection. The selected features are expected to contain the relevant information from the input data, so that the desired task can be performed by using this reduced representation instead of the complete initial data. DNN utilizes a stack of layers, where each layer performs a function. For example, the layer could be a convolution, a non-linear transform, the calculation of an average, etc. Eventually this DNN produces outputs by classifier 414. In FIG. 4, the data travels from left to right and the features are extracted. The goal of training the neural network is to find the parameters of all the layers that make them adequate for the desired task.

As shown in FIG. 4, a "stride of 4" filter is applied at layer 406, and max pooling is applied at layers 407-413. The stride controls how the filter convolves around the input volume. "Stride of 4" refers to the filter convolving around the input volume four units at a time. Max pooling refers to down-sampling by selecting the maximum value in each max pooled region.

In some example embodiments, the structure of each layer is predefined. For example, a convolution layer may contain small convolution kernels and their respective convolution parameters, and a summation layer may calculate the sum, or the weighted sum, of two pixels of the input image. Training assists in defining the weight coefficients for the summation.

One way to improve the performance of DNNs is to identify newer structures for the feature-extraction layers, and another way is by improving the way the parameters are identified at the different layers for accomplishing a desired task. The challenge is that for a typical neural network, there may be millions of parameters to be optimized. Trying to optimize all these parameters from scratch may take hours, days, or even weeks, depending on the amount of computing resources available and the amount of data in the training set.

Figure 5:
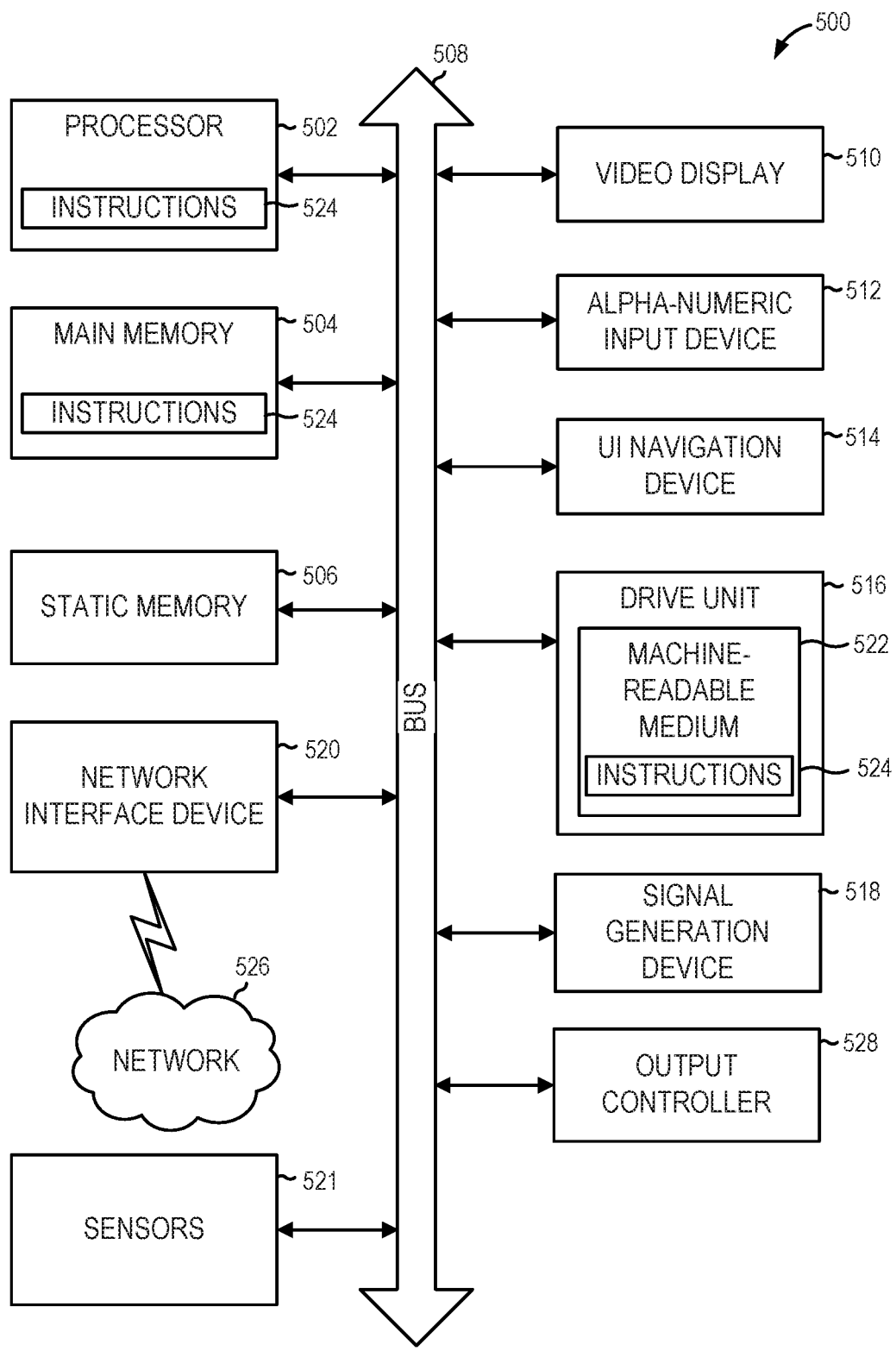
FIG. 5 is a block diagram of a computing machine, in accordance with some embodiments.

FIG. 5 illustrates a circuit block diagram of a computing machine 500 in accordance with some embodiments. In some embodiments, components of the computing machine 500 may store or be integrated into other components shown in the circuit block diagram of FIG. 5. For example, portions of the computing machine 500 may reside in the processor 502 and may be referred to as "processing circuitry." Processing circuitry may include processing hardware, for example, one or more central processing units (CPUs), one or more graphics processing units (GPUs), and the like. In alternative embodiments, the computing machine 500 may operate as a standalone device or may be connected (e.g., networked) to other computers. In a networked deployment, the computing machine 500 may operate in the capacity of a server, a client, or both in server-client network environments. In an example, the computing machine 500 may act as a peer machine in peer-to-peer (P2P) (or other distributed) network environment. In this document, the phrases P2P, device-to-device (D2D) and sidelink may be used interchangeably. The computing machine 500 may be a specialized computer, a personal computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems/apparatus (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The computing machine 500 may include a hardware processor 502 (e.g., a central processing unit (CPU), a GPU, a hardware processor core, or any combination thereof), a main memory 504 and a static memory 506, some or all of which may communicate with each other via an interlink (e.g., bus) 508. Although not shown, the main memory 504 may contain any or all of removable storage and non-removable storage, volatile memory or non-volatile memory. The computing machine 500 may further include a video display unit 510 (or other display unit), an alphanumeric input device 512 (e.g., a keyboard), and a user interface (UI) navigation device 514 (e.g., a mouse). In an example, the display unit 510, input device 512 and UI navigation device 514 may be a touch screen display. The computing machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The computing machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The drive unit 516 (e.g., a storage device) may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the computing machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the computing machine 500 and that cause the computing machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas to connect to the communications network 526.

Traditional supervised machine learning (ML) techniques may, in some cases, leverage "truth" data to train algorithms. Training data sets in computer vision may, in some cases, leverage humans (or previously trained machine(s)) to annotate the imagery. Because images are annotated by people, the annotations are prone to error and many other human biases that are difficult to control. Further, not all people are equally skilled at annotating images accurately and certain images are more difficult to annotate than others. Metrics that quantify the quality of image annotations are valuable in itself and for ML application. Some aspects are directed to a metric for evaluating the veracity of multiple independent annotations.

Figure 6:
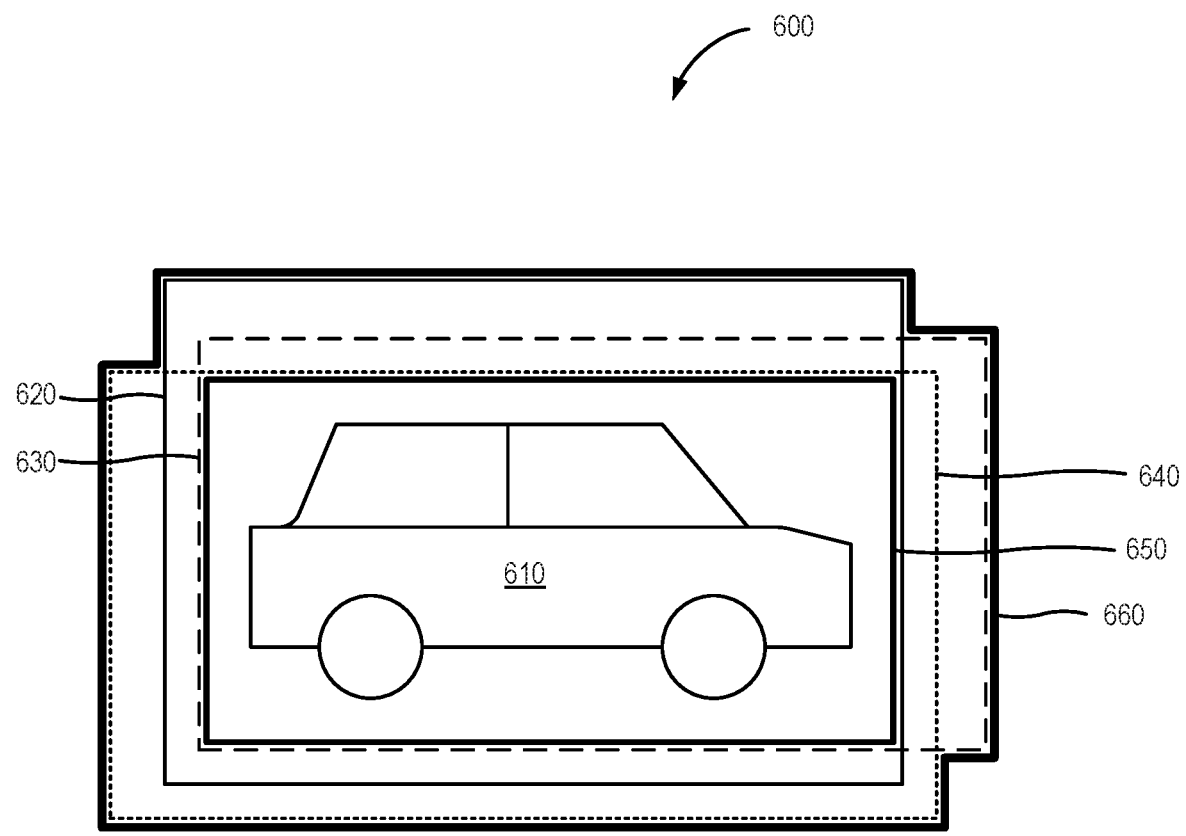
FIG. 6 illustrates an image with one object that was labeled, in accordance with some embodiments.

The traditional metric for annotation precision is the intersection of all annotations pixels over the union of annotations pixels. Annotations may be defined in pixel units. For example, FIG. 6 illustrates an image 600 with one object 610 that was labeled. This object 610, a vehicle, was labeled by three different annotators with three different polygons 620, 630, and 640. The intersection 650 of all the various polygons includes pixels that reside within each and every one of the polygons 620, 630, and 640. The union 660 (i.e., the overlapping areas) of all the polygons 620, 630, and 640 includes pixels that reside in at least one of the polygons 620, 630, and 640. In this case, accuracy is measured taking the area of the intersection polygon and dividing it by the area of the union polygon. This is denoted mathematically as $$\frac{\text{Intersection}}{\text{Union}} \text{ or } \frac{I}{U}.$$

However, with the advent of ML and crowdsourcing of annotations, a more precise metric may be desirable.

In the era of ML, supervised approaches rely on the quality of hand labeled training data in order to create high quality algorithms. As described above, $$\frac{I}{U}$$

is the state of the art in evaluating the quality of annotations provided from multiple independent annotators. Another metric for annotation accuracy for images annotated by more than one person is the intersection of the annotations, divided by the average pixels on target (APOT) of the annotations. Mathematically, this is represented as $$\frac{I}{APOT}.$$

This metric normalizes the agreement amongst the annotators by the average size of the annotation, providing a number between 0 and 1 which roughly represents the precision of annotation. On one end of the spectrum, both $$\frac{I}{APOT} \text{ and } \frac{I}{U}$$

equal 1 when all annotations completely overlap. At the other extreme, $$\frac{I}{APOT} \text{ and } \frac{I}{U}$$

equal 0 when the annotations do not overlap at all.

Figure 7A:
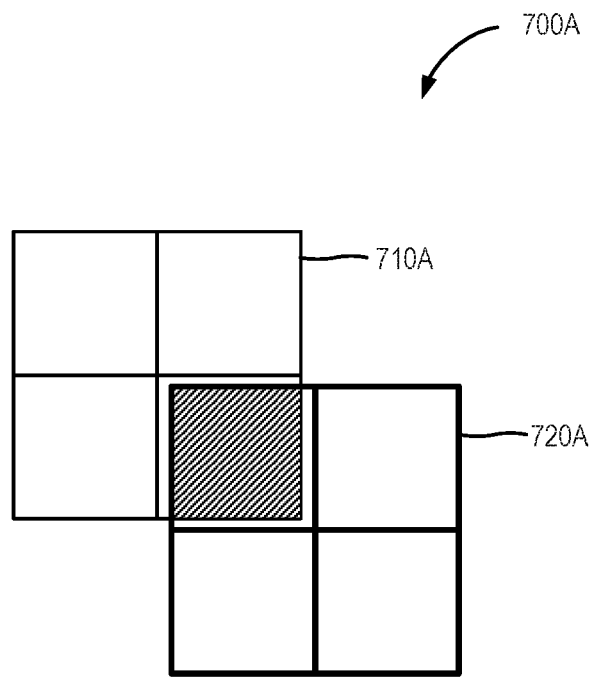
FIGS. 7A-7B illustrate example annotations of two targets, in accordance with some embodiments.
Figure 7B:
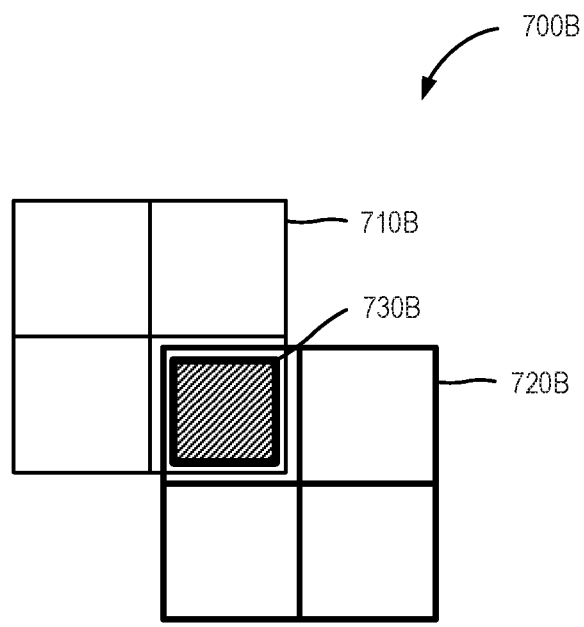

FIGS. 7A-7B illustrate example annotations of two targets, in accordance with some embodiments. In some cases, $$\frac{I}{APOT}$$

provides a better metric for annotation precision because it can measure different types of variances in annotation with more precision. Take for example the two annotations shown in FIGS. 7A-7B.

FIGS. 7A-7B illustrate images 700A and 700B, respectively, with annotated targets. In FIG. 7A, the annotation was performed by two different annotators, which generated polygons 710A and 720A. Each annotation is 4 pixels and the intersection area is 1 pixel in size. This leads to an $$\frac{I}{U} = 1/7 \text{ and an } \frac{I}{APOT} = 1/4.$$

The annotation in FIG. 7B was performed by three annotators, which generated polygons 710B, 720B, and 730B. The intersection area is again 1 pixel in size. In the situation shown in FIG. 7B, the intersection over union stays the same at 1/7. However, the $$\frac{I}{APOT}$$

now equals 1/3. This additional precision is not captured with the traditional $$\frac{I}{U}$$

metric. Various measurements for FIGS. 7A-7B are shown in Table 1.

TABLE 1

Measurements for FIGS. 7A-7B

| FIG. 7A | FIG. 7B |
|---|---|
| I = 1 | I = 1 |
| U = 7 | U = 7 |
| APOT = 4 | APOT = 3 |
| I/U = 1/7 | I/U = 1/7 |
| I/APOT = 1/4 | I/APOT = 1/3 |

Figure 8:
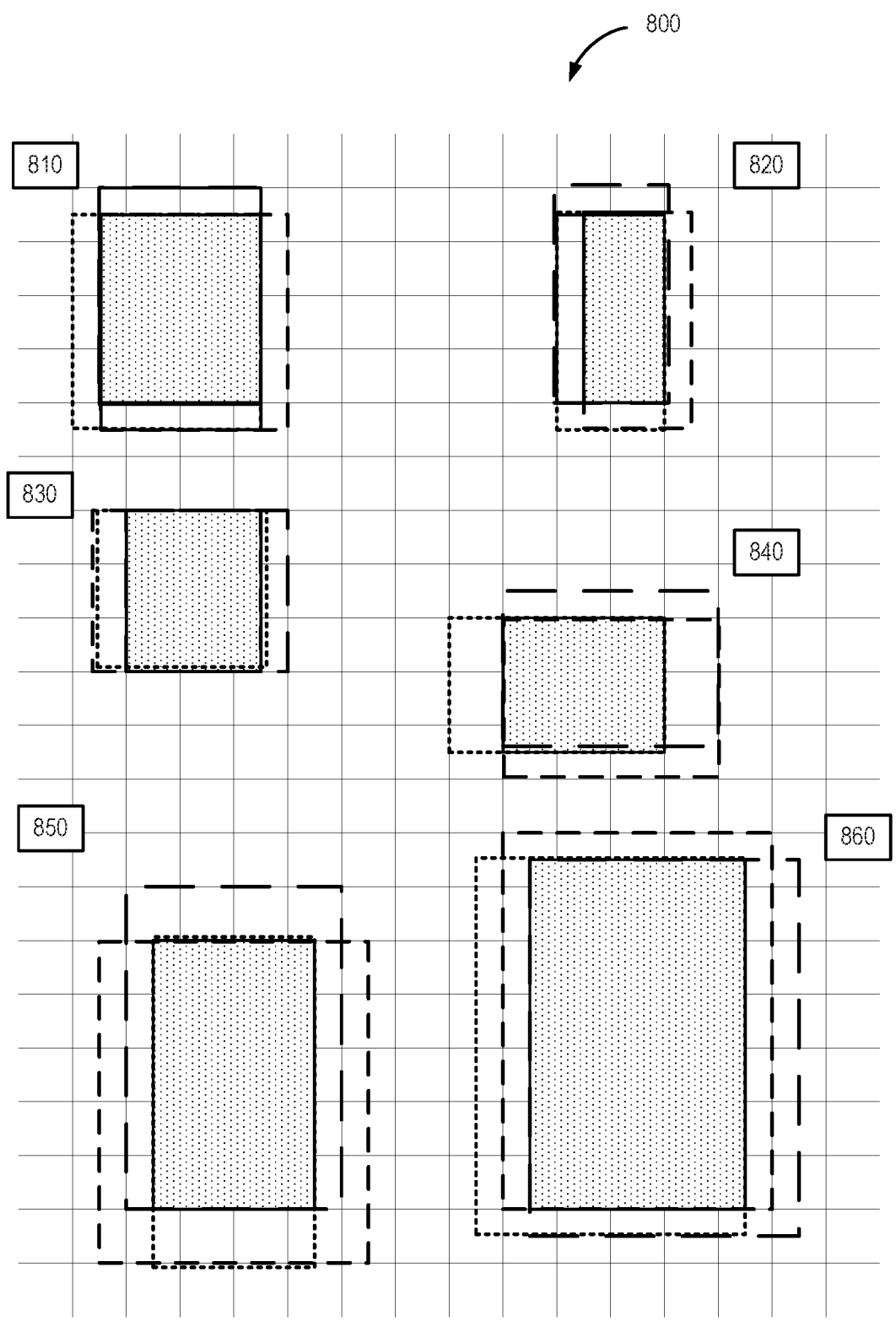
FIG. 8 illustrates example annotations for targets in an image, in accordance with some embodiments.

FIG. 8 illustrates example annotations for targets 810, 820, 830, 840, 850, and 860 in an image 800, in accordance with some embodiments. After drawing out some hypothetical scenarios in FIG. 8, it is shown that the I/APOT metric does not result in the same precision score as the existing metric. FIG. 8 and Table 2 substantiate this position.

TABLE 2

I/U and I/APOT for FIG. 8

| Target | Intersection/Union | Intersection/APOT |
|---|---|---|
| 810 | 9/16.5 = .5455 | 9/(38/3) = .7105 |
| 820 | 7.5/10.5 = .7143 | 7.5/9 = .8333 |
| 830 | 7.5/16.5 = .4545 | 7.5/(34/3) = .6618 |
| 840 | 15/34 = .4412 | 15/24 = .625 |
| 850 | 26/42 = .6190 | 26/35 = .7429 |
| 860 | 5.25/11 = .4773 | 5.25/8 = .6563 |

Ranking using Intersection/Union Metric=840, 830, 860, 810, 850, 820
Ranking using Intersection/APOT=840, 860, 830, 810, 850, 820

Table 2 calculates the annotation precision using the I/U method as well as the I/APOT method. It is important to note that when the different annotated targets are ranked using different metrics, there is a change in the order to the rank, underscoring the difference of the methods. This difference would be more prominent in large data sets when there are hundreds or thousands of annotated targets, rather than just six targets, as illustrated in FIG. 8.

Having a metric for annotation accuracy that has includes greater precision has multiple applications: It allows for the quantitative comparison of a group of annotators compared to another group of annotators if both groups annotate the same images. It can also provide insight on the effects that different imagery characteristics have on the ability of people to accurately annotate targets, or the relative difficulty of a particular annotation. If characteristics of an image can be quantified, regression analysis can be done designating the accuracy metric as the output of the function and the different characteristics of the images as the inputs of the function. A large enough data set will provide the necessary foundation to design a function that shows which characteristics of images positively impact annotation accuracy and which characteristics negatively impact annotation accuracy. An accuracy function will allow computing machine(s) to compare the value of multiple data sets against one another. If two data sets are equally costly, this function will allow computing machine(s) to determine which one will likely lead to more accurate annotations which should result in more accurate machine learning algorithms.

The Metric of intersection divided by the average pixels on target and the metric of intersection divided by union are measures of accuracy. However, in the context of multiple independent annotations, I/APOT is more precise than I/U.

If the I/APOT metric is used, it is technically possible to achieve an accuracy score of 100% if the annotators miss the target completely but are in full agreement with one another. Although this is technically possible, this might not happen if the annotators are certain of the target they are supposed to be annotating. There could however be instances where the accuracy score is higher than it should be simply because it is precise by chance. The disparity between the accuracy and precision is unknown, as well as the likelihood that a precise group of annotations are inaccurate.

Figure 9:
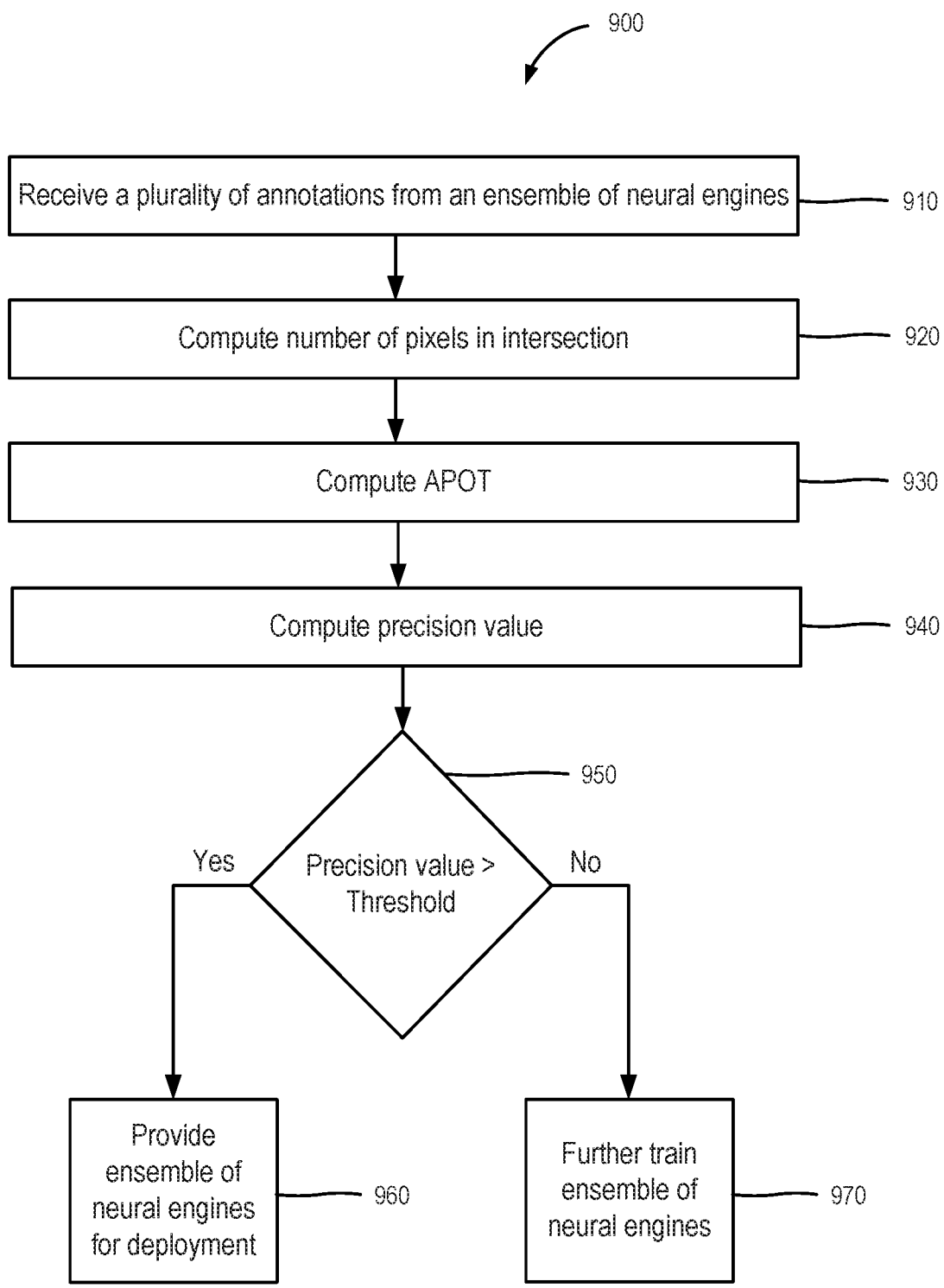
FIG. 9 is a flow chart illustrating an example method for using a precision value in training an ensemble of neural networks, in accordance with some embodiments.

FIG. 9 is a flow chart illustrating an example method 900 for using a precision value in training an ensemble of neural networks, in accordance with some embodiments. The method 900 may be implemented at one or more computing machines, for example, the computing machine 500 of FIG. 5.

At operation 910, the computing machine(s) receive, for a given target in a given image, a plurality of annotations. Each annotation indicates a range of pixels corresponding to a given target. In some cases, at least one annotation is a bounding box or any other polygon. In some cases, at least one annotation in the plurality of annotations is generated by a human. In some cases, at least one annotation in the plurality of annotations is generated by a computing machine (either from among the computing machine(s) or a separate and distinct computing machine). In some cases, as discussed below, the plurality of annotations are generated by an ensemble of neural engines operating at the computing machine(s). The ensemble of neural engines may include multiple neural engines (e.g., neural networks implemented using software, hardware or combination of software and hardware), each of which is configured to identify the same type of target in an image (e.g., a vehicle, a ship, a tank, etc.). The ensemble of neural engines may include one or more of a convolutional neural network, a deep neural network, an artificial neural network, and the like.

At operation 920, the computing machine(s) compute a number of pixels in an intersection of the plurality of annotations.

At operation 930, the computing machine(s) compute an APOT for the given target by computing, for each annotation, a number of pixels that corresponds to the given target and taking a mean of those numbers.

At operation 940, the computing machine(s) compute a precision value of the plurality of annotations as the number of pixels in the intersection divided by the APOT. The computing machine(s) may provide an output representing the precision value.

At operation 950, the computing machine(s) determine whether the precision value exceeds a predefined threshold (e.g., 0.5, 0.8, 0.97, etc.). If so, the method 900 continues to operation 960. If not, the method 900 continues to operation 970.

At operation 960, upon determining that the precision value exceeds the predefined threshold, the computing machine(s) determine that the ensemble of neural engines has been adequately trained to identify the target. The computing machine(s) provide one or more neural engines in the ensemble for deployment. After operation 960, the method 900 ends.

At operation 970, upon determining that the precision value does not exceed the predefined threshold, the computing machine(s) determine that the ensemble of neural engines has not been adequately trained to identify the target. The computing machine(s) further train at least one neural engine in the ensemble before deployment. After operation 970, the method 900 ends.

Some embodiments may be described as numbered examples (Example 1, 2, 3, etc.). These numbered examples are provided as examples only and do not limit the disclosed technology.

Example 1 is a method implemented at one or more computing machines, the method comprising: receiving, for a given target in a given image, a plurality of annotations, each annotation indicating a range of pixels corresponding to the given target; computing a number of pixels in an intersection of the plurality of annotations; computing an average pixels on target (APOT) for the given target by computing, for each annotation, a number of pixels that corresponds to the given target and taking a mean of those numbers; computing a precision value of the plurality of annotations as the number of pixels in the intersection divided by the APOT; and providing an output representing the precision value.

In Example 2, the subject matter of Example 1 includes, wherein the plurality of annotations are generated by an ensemble of neural engines operating at one or more computing machines, the method further comprising: if the precision value exceeds a predefined threshold: determining that the ensemble of neural engines has been adequately trained to identify the target; and providing one or more neural engines in the ensemble for deployment; and if the precision value does not exceed the predefined threshold: determining that the ensemble of neural engines has not been adequately trained to identify the target; and further training at least one neural engine in the ensemble before deployment.

In Example 3, the subject matter of Examples 1-2 includes, wherein at least one annotation in the plurality of annotations is generated by a human.

In Example 4, the subject matter of Examples 1-3 includes, wherein at least one annotation in the plurality of annotations is generated by a computing machine.

In Example 5, the subject matter of Examples 1-4 includes, wherein at least one annotation in the plurality of annotations comprises a bounding box or a polygon.

Example 6 is a non-transitory machine-readable medium storing instructions which, when executed by one or more computing machines, cause the one or more computing machines to perform operations comprising: receiving, for a given target in a given image, a plurality of annotations, each annotation indicating a range of pixels corresponding to the given target; computing a number of pixels in an intersection of the plurality of annotations; computing an average pixels on target (APOT) for the given target by computing, for each annotation, a number of pixels that corresponds to the given target and taking a mean of those numbers; computing a precision value of the plurality of annotations as the number of pixels in the intersection divided by the APOT; and providing an output representing the precision value.

In Example 7, the subject matter of Example 6 includes, wherein the plurality of annotations are generated by an ensemble of neural engines operating at one or more computing machines, the operations further comprising: if the precision value exceeds a predefined threshold: determining that the ensemble of neural engines has been adequately trained to identify the target; and providing one or more neural engines in the ensemble for deployment; and if the precision value does not exceed the predefined threshold: determining that the ensemble of neural engines has not been adequately trained to identify the target; and further training at least one neural engine in the ensemble before deployment.

In Example 8, the subject matter of Examples 6-7 includes, wherein at least one annotation in the plurality of annotations is generated by a human.

In Example 9, the subject matter of Examples 6-8 includes, wherein at least one annotation in the plurality of annotations is generated by a computing machine.

In Example 10, the subject matter of Examples 6-9 includes, wherein at least one annotation in the plurality of annotations comprises a bounding box or a polygon.

Example 11 is an apparatus comprising: processing circuitry; and a memory storing instructions which, when executed by the processing circuitry, cause the processing circuitry to perform operations comprising: receiving, for a given target in a given image, a plurality of annotations, each annotation indicating a range of pixels corresponding to the given target; computing a number of pixels in an intersection of the plurality of annotations; computing an average pixels on target (APOT) for the given target by computing, for each annotation, a number of pixels that corresponds to the given target and taking a mean of those numbers; computing a precision value of the plurality of annotations as the number of pixels in the intersection divided by the APOT; and providing an output representing the precision value.

In Example 12, the subject matter of Example 11 includes, wherein the plurality of annotations are generated by an ensemble of neural engines, the operations further comprising: if the precision value exceeds a predefined threshold: determining that the ensemble of neural engines has been adequately trained to identify the target; and providing one or more neural engines in the ensemble for deployment; and if the precision value does not exceed the predefined threshold: determining that the ensemble of neural engines has not been adequately trained to identify the target; and further training at least one neural engine in the ensemble before deployment.

In Example 13, the subject matter of Examples 11-12 includes, wherein at least one annotation in the plurality of annotations is generated by a human.

In Example 14, the subject matter of Examples 11-13 includes, wherein at least one annotation in the plurality of annotations is generated by a computing machine.

In Example 15, the subject matter of Examples 11-14 includes, wherein at least one annotation in the plurality of annotations comprises a bounding box or a polygon.

Example 16 is a system comprising: means for receiving, for a given target in a given image, a plurality of annotations, each annotation indicating a range of pixels corresponding to the given target; means for computing a number of pixels in an intersection of the plurality of annotations; means for computing an average pixels on target (APOT) for the given target by computing, for each annotation, a number of pixels that corresponds to the given target and taking a mean of those numbers; means for computing a precision value of the plurality of annotations as the number of pixels in the intersection divided by the APOT; and means for providing an output representing the precision value.

In Example 17, the subject matter of Example 16 includes, wherein the plurality of annotations are generated by an ensemble of neural engines, the system further comprising: if the precision value exceeds a predefined threshold: means for determining that the ensemble of neural engines has been adequately trained to identify the target; and means for providing one or more neural engines in the ensemble for deployment; and if the precision value does not exceed the predefined threshold: means for determining that the ensemble of neural engines has not been adequately trained to identify the target; and means for further training at least one neural engine in the ensemble before deployment.

In Example 18, the subject matter of Examples 16-17 includes, wherein at least one annotation in the plurality of annotations is generated by a human.

In Example 19, the subject matter of Examples 16-18 includes, wherein at least one annotation in the plurality of annotations is generated by a computing machine.

In Example 20, the subject matter of Examples 16-19 includes, wherein at least one annotation in the plurality of annotations comprises a bounding box or a polygon.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "Abut not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, user equipment (UE), article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method implemented at one or more computing machines, the method comprising:
receiving, for a given target in a given image, a plurality of annotations, each annotation indicating a range of pixels corresponding to the given target;
computing a number of pixels in an intersection of the plurality of annotations;
computing an average pixels on target (APOT) for the given target by computing, for each annotation, a number of pixels that corresponds to the given target and taking a mean of those numbers;
computing a precision value of the plurality of annotations as the number of pixels in the intersection divided by the APOT; and
providing an output representing the precision value.

2. The method of claim 1, wherein the plurality of annotations are generated by an ensemble of neural engines operating at one or more computing machines, the method further comprising:
if the precision value exceeds a predefined threshold:
determining that the ensemble of neural engines has been adequately trained to identify the target; and
providing one or more neural engines in the ensemble for deployment; and
if the precision value does not exceed the predefined threshold:
determining that the ensemble of neural engines has not been adequately trained to identify the target; and
further training at least one neural engine in the ensemble before deployment.

3. The method of claim 1, wherein at least one annotation in the plurality of annotations is generated by a human.

4. The method of claim 1, wherein at least one annotation in the plurality of annotations is generated by a computing machine.

5. The method of claim 1, wherein at least one annotation in the plurality of annotations comprises a bounding box or a polygon.

6. A non-transitory machine-readable medium storing instructions which, when executed by one or more computing machines, cause the one or more computing machines to perform operations comprising:
receiving, for a given target in a given image, a plurality of annotations, each annotation indicating a range of pixels corresponding to the given target;
computing a number of pixels in an intersection of the plurality of annotations;
computing an average pixels on target (APOT) for the given target by computing, for each annotation, a number of pixels that corresponds to the given target and taking a mean of those numbers;
computing a precision value of the plurality of annotations as the number of pixels in the intersection divided by the APOT; and
providing an output representing the precision value.

7. The machine-readable medium of claim 6, wherein the plurality of annotations are generated by an ensemble of neural engines operating at one or more computing machines, the operations further comprising:
if the precision value exceeds a predefined threshold:
determining that the ensemble of neural engines has been adequately trained to identify the target; and
providing one or more neural engines in the ensemble for deployment; and
if the precision value does not exceed the predefined threshold:
determining that the ensemble of neural engines has not been adequately trained to identify the target; and
further training at least one neural engine in the ensemble before deployment.

8. The machine-readable medium of claim 6, wherein at least one annotation in the plurality of annotations is generated by a human.

9. The machine-readable medium of claim 6, wherein at least one annotation in the plurality of annotations is generated by a computing machine.

10. The machine-readable medium of claim 6, wherein at least one annotation in the plurality of annotations comprises a bounding box or a polygon.

11. An apparatus comprising:
processing circuitry; and
a memory storing instructions which, when executed by the processing circuitry, cause the processing circuitry to perform operations comprising:
receiving, for a given target in a given image, a plurality of annotations, each annotation indicating a range of pixels corresponding to the given target;
computing a number of pixels in an intersection of the plurality of annotations;
computing an average pixels on target (APOT) for the given target by computing, for each annotation, a number of pixels that corresponds to the given target and taking a mean of those numbers;
computing a precision value of the plurality of annotations as the number of pixels in the intersection divided by the APOT; and
providing an output representing the precision value.

12. The apparatus of claim 11, wherein the plurality of annotations are generated by an ensemble of neural engines, the operations further comprising:
if the precision value exceeds a predefined threshold:
determining that the ensemble of neural engines has been adequately trained to identify the target; and
providing one or more neural engines in the ensemble for deployment; and
if the precision value does not exceed the predefined threshold:
determining that the ensemble of neural engines has not been adequately trained to identify the target; and
further training at least one neural engine in the ensemble before deployment.

13. The apparatus of claim 11, wherein at least one annotation in the plurality of annotations is generated by a human.

14. The apparatus of claim 11, wherein at least one annotation in the plurality of annotations is generated by a computing machine.

15. The apparatus of claim 11, wherein at least one annotation in the plurality of annotations comprises a bounding box or a polygon.

* * * * *